(12) United States Patent
Kim et al.

(10) Patent No.: US 8,659,868 B2
(45) Date of Patent: Feb. 25, 2014

(54) VARIABLE CAPACITOR AND METHOD FOR DRIVING THE SAME

(75) Inventors: Chang Wook Kim, Seoul (KR); Dong Chan Park, Seoul (KR); Ju Young Song, Seoul (KR); Sang Hun Lee, Seoul (KR); Sung Bae Cho, Seoul (KR); Hyun Ho Yang, Seoul (KR); Jun Bo Yoon, Seoul (KR); Dong Hun Choi, Seoul (KR); Chang Hun Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 43 days.

(21) Appl. No.: 13/520,031

(22) PCT Filed: May 27, 2011

(86) PCT No.: PCT/KR2011/003913
§ 371 (c)(1),
(2), (4) Date: Jun. 29, 2012

(87) PCT Pub. No.: WO2011/149308
PCT Pub. Date: Dec. 1, 2011

(65) Prior Publication Data
US 2013/0135786 A1 May 30, 2013

(30) Foreign Application Priority Data

May 28, 2010 (KR) .......... 10-2010-0050590

(51) Int. Cl.
*H01G 5/16* (2006.01)

(52) U.S. Cl.
USPC ........ 361/290; 361/278; 361/280; 361/283.1; 361/287; 361/277

(58) Field of Classification Search
USPC .......... 361/272–273, 277–278, 280, 361/283.1–283.3, 286–287, 290–292
See application file for complete search history.

(56) References Cited

U.S. PATENT DOCUMENTS

| 6,151,966 A * | 11/2000 | Sakai et al. ............. 73/514.32 |
| 6,229,684 B1 * | 5/2001 | Cowen et al. ............. 361/278 |
| 6,507,475 B1 * | 1/2003 | Sun ............. 361/281 |
| 6,833,985 B2 * | 12/2004 | Fujii et al. ............. 361/281 |
| 7,006,342 B2 * | 2/2006 | Williams et al. ............. 361/281 |
| 7,054,132 B2 * | 5/2006 | Yoshida et al. ............. 361/277 |
| 7,082,024 B2 * | 7/2006 | Casset et al. ............. 361/277 |
| 7,881,038 B2 * | 2/2011 | Nishiyama ............. 361/277 |
| 8,039,922 B2 | 10/2011 | Ni |
| 2003/0079983 A1 | 5/2003 | Long et al. |

FOREIGN PATENT DOCUMENTS

| JP | 59-044035 U | 3/1984 |
| JP | 2003-524895 A | 8/2003 |
| JP | 2010-045217 A | 2/2010 |
| KR | 10-2009-0001040 A | 1/2009 |

OTHER PUBLICATIONS

International Search Report in International Application No. PCT/KR2011/003913, filed May 27, 2011.

* cited by examiner

*Primary Examiner* — Nguyen T Ha
(74) *Attorney, Agent, or Firm* — Saliwanchik, Lloyd & Eisenschenk

(57) ABSTRACT

Disclosed herein is a variable capacitor and its driving method, the variable capacitor including, a movable first electrode; and a second electrode formed with an insulating film, fixed in place, and its insulating film contacting the first electrode that is moved.

7 Claims, 3 Drawing Sheets

(4a)

(4b)

(2a)

(2b)

(3a)  (3b)

(3c)  (3d)

(4a)

(4b)

VARIABLE CAPACITOR AND METHOD FOR DRIVING THE SAME

CROSS-REFERENCE TO RELATED APPLICATIONS

This application is the U.S. national stage application of International Patent Application No. PCT/KR2011/003913, filed May 27, 2011, which claims priority to Korean Application No. 10-2010-0050590, filed May 28, 2010, the disclosures of each of which are incorporated herein by reference in their entirety.

TECHNICAL FIELD

The present invention relates to a variable capacitor and its driving method.

BACKGROUND ART

In a mobile communication system, an RF (Radio Frequency) block is designed to support several frequency bands, and in particular, capacitors used in a filter directly related to frequency bands must utilize a variable capacitor (also called variable reactance) having a different capacitance value at each frequency band.

In addition, a voltage controlled oscillator (VCO) among components of an RF block can obtain a change in capacitance value by adjusting a voltage applied to a variable capacitor, and thus alter a resonant frequency.

As such, a variable capacitor is a very important device in a tunable filter or a voltage controlled oscillator of an RF block.

DISCLOSURE OF INVENTION

Technical Problem

The present invention solves challenges capable of realizing a variable capacitor by a determination of a capacitance value according to a size of an area overlapped with electrodes and operating a variable range to infinity.

Solution to Problem

The present disclosure provides a variable capacitor including, a movable first electrode; and a second electrode formed with an insulating film, fixed in place, and its insulating film contacting the first electrode that is moved.

The present invention provides a variable capacitor including, a fixed first electrode; and a second electrode formed with an insulating film, the insulating film contacting the first electrode when it is moved.

And, a driving force moving the first electrode or the second electrode is one of electrostatic force, piezoelectric force, heat driving force and magnetic force.

Also, the first electrode or the second electrode is moved, fixed closely adhering to the insulating film.

Also, a movement of the first electrode or the second electrode is performed by a 2-axial movement.

The present invention provides a drive method of a variable capacitor including, forming a capacitor comprised of an insulating film and a second electrode, by moving a first electrode and closely adhering it to an insulating film formed in the second electrode, or moving the second electrode and closely adhering the insulating film of the second electrode to the first electrode; and flowing through an RF signal from the first electrode to the second electrode, or from the second electrode to the first electrode.

And, according to a size of an area overlapped with the first electrode and the second electrode, a capacitance value varies.

In addition, a driving force moving the first electrode or the second electrode is one of electric force, piezoelectric force, heat driving force and magnetic force.

Advantageous Effects of Invention

As an advantageous effect of a variable capacitor of the present invention, since a first electrode is fixed closely attaching to a second electrode formed with an insulating film, a set capacitance value is not subject to change at all when a high RF power between a first electrode and a second electrode is applied, which occurring an electrostatic attraction.

In addition, a variable capacitor of the present invention has an effect of capable of an operation of a variable capacitor and infinitely operating a variable range, since based on a size of an area overlapped with a first electrode and a second electrode, a capacitance value is determined.

BEST MODE FOR CARRYING OUT THE INVENTION

Hereinafter, a reference will be made to the accompanying drawings to describe an embodiment of the invention.

Figure 1:
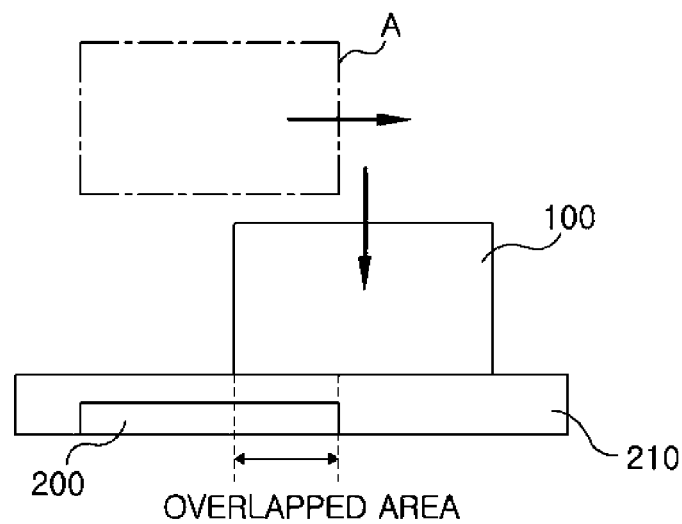
FIG. 1 is a schematic conceptual diagram for describing a variable capacitor according to the invention.

FIG. 1 is a schematic conceptional view for describing a variable capacitor according to the invention.

A variable capacitor according to the present invention with its construction includes a movable first electrode 100; and a second electrode 200 formed with an insulating film 210, fixed in place, and in which the first electrode 100 is moved contacting its insulating film 210.

That is, the first electrode 100 moves from an initial state 'A' area of FIG. 1 and then clings to the insulating film 210, therefore forming a capacitor composed of the first electrode 100, the insulating film 210 and the second electrode 200.

At this time, according to a size of an area overlapped with the first electrode 100 and the second electrode 200 a capacitance value differs, thereby enabling an operation of a variable capacitor.

Herein, the first electrode 100, maintaining a floating state at an initial state from the second electrode 200, may be called an upper part electrode, and the second electrode 200 placed at a lower part of the first electrode 100 may be called a lower part electrode.

And, from the first electrode 100 to the second electrode 200, or from the second electrode 200 to the first electrode 100, an RF signal may flow, after which the RF signal passes through a capacitor composed of the first electrode 100, the insulating film 210 and the second electrode 200.

Such a variable capacitor of the invention, upon deliberation that the first electrode 100 is fixed closely attaching to the second electrode 200, has a good point in that a set capacitance value does not change when a high RF power between the first electrode 100 and the second electrode 200 is applied, which occurring electrostatic attraction.

Also, a variable capacitor of the invention leaves its capacitance value determined based on a size of an area overlapped with the first electrode 100 and the second electrode 200, thus capable of an operation of a variable capacitor and operating a variable range (that is, tuning ratio) to its infinity.

Figure 2:
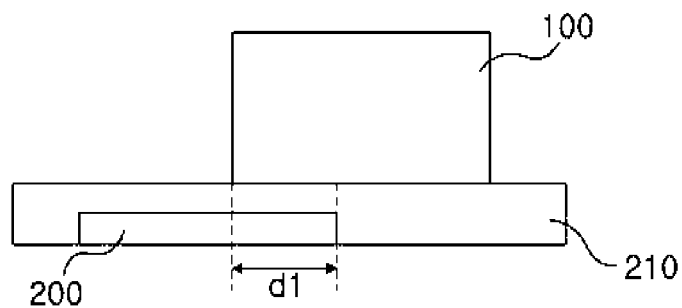
FIGS. 2a and 2b are conceptual cross-sections for describing an operation that a capacitance value varies at a variable capacitor according to the present invention.
Figure 2:
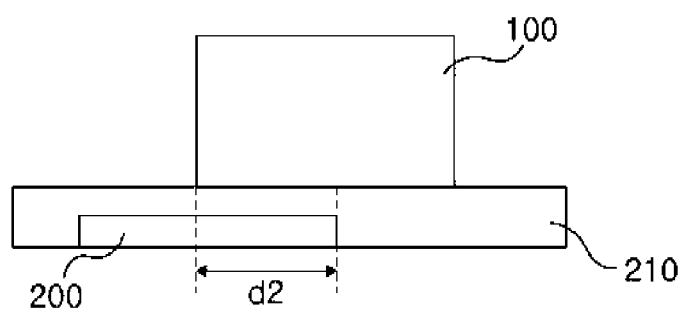

FIGS. 2a and 2b are schematic conceptual diagrams for describing an operation by which a capacitance value varies at a variable capacitor according to the invention.

A first electrode 100 of a variable capacitor moves from an initial state floated over a second electrode 200 and clings to an insulating film 210 formed in the second electrode 200.

At this time, a capacitor composed of the first electrode 100, the insulating film 210 and the second electrode 200 is formed.

In a state that the first electrode 100 clings to the insulating film 200, based on a size of an area overlapped with the first electrode and the second electrode, a capacitance value varies.

That is, an area overlapped with the first electrode 100 and the second electrode 200 is 'd1' in FIG. 2a, and 'd2' in FIG. 2b, and when 'd2' is greater than 'd1', a state of FIG. 2b has a larger capacitance value than a status of FIG. 2a.

On the one hand, the present invention may include a capacitor structure and a driving method capable of varying a capacitance value in which the insulating film 210 is applied with a plurality of insulating films with a different dielectric constant, performing an operation of moving the first electrode 100 and clinging to the insulating film 210, so that at least one of the plurality of insulating films is interposed between the first electrode 100 and the second electrode 200 to adjust a dielectric constant of the insulating film 210.

FIGS. 3a through 3d are conceptual diagrams for describing a drive method of a variable capacitor according to the invention.

Figure 3:
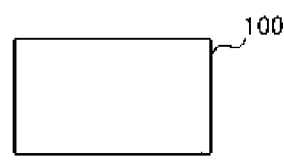
FIGS. 3a through 3d are conceptual diagrams for describing a drive method of a variable capacitor according to the invention.
Figure 3:
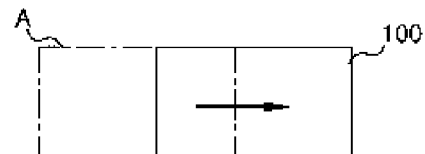
Figure 3:
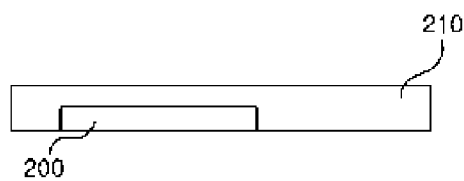
Figure 3:
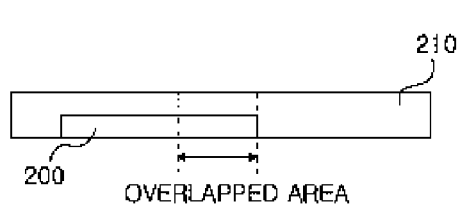
Figure 3:
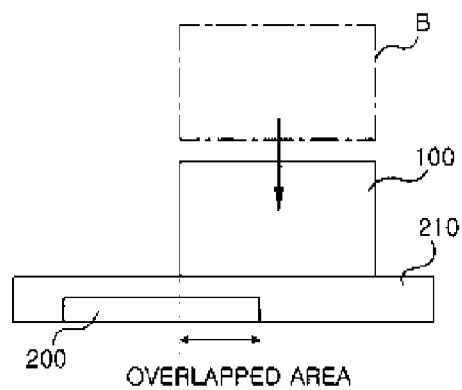
Figure 3:
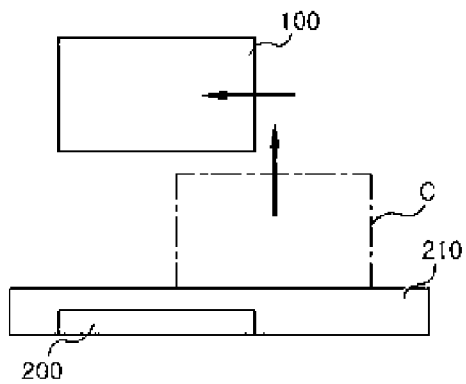

Describing a drive method of a variable capacitor according to the invention, first, as shown in FIG. 3a, in a state that a first electrode 100 floats over an upper surface of a second electrode 200, the first electrode 100 is moved in an X direction as shown in FIG. 3b.

That is, consulting FIG. 3b, the first electrode 100 is moved from an initial state 'A' to an X direction.

The next, in state 'B' resulting that the first electrode 100 is moved to an X direction, by moving the first electrode 100 into a Y direction, the first electrode 100 is closely attached and fixed to an insulating film 210 formed in the second electrode 200. (FIG. 3c)

Herein, depending on a degree the first electrode 100 moves into an X direction, a size of an overlapped area of the first electrode 100 and the second electrode 200 is determined, and a capacitance value is decided.

At this time, a drive method of a variable capacitor of the invention may be performed additionally including a step that the first electrode 100 is closely stuck and fixed to an insulating film 210 formed in the second electrode 200, then flowing an RF signal from the first electrode 100 to the second electrode 200, or from the second electrode 200 to the first electrode 100.

Thereafter, to newly vary a capacitance value next the first electrode 100 is closely attached and fixed to the insulating film 210, as shown in FIG. 3d, by moving the first electrode 100 into a Y direction and an X direction from a state 'C' of closely attaching and fixing to the insulating film 210, the first electrode 100 reverts to its initial state like FIG. 3a.

Figure 4:
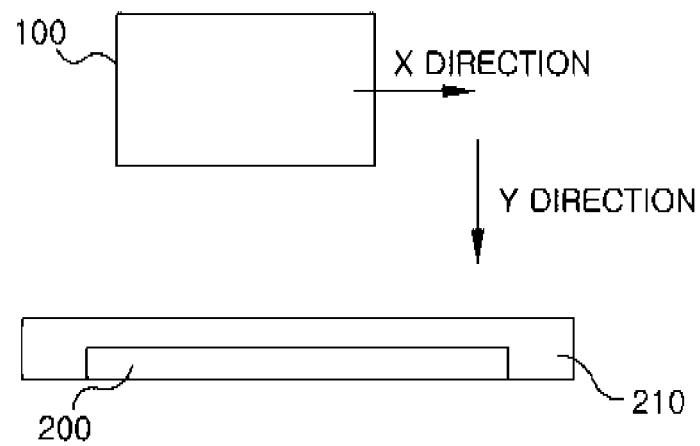
FIGS. 4a and 4b are conceptual diagrams for describing an electrode that is moved at a variable capacitor according to the present invention.
Figure 4:
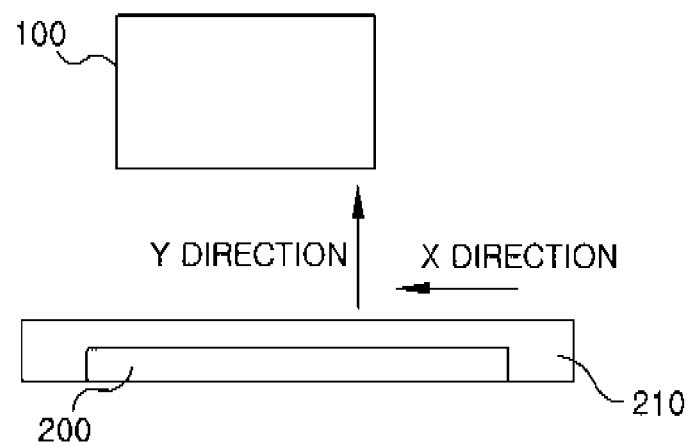

FIGS. 4a and 4b are conceptual cross-sections for describing an electrode moved at a variable capacitor according to the invention.

In a variable capacitor according to the present invention, as described above, a first electrode 100 may be moved towards a second electrode 200, and the second electrode 200 may be moved toward the first electrode 100.

In a variable capacitor configured that the second electrode 200 moves to the first electrode 100 direction, the first electrode 100 must be fixated.

Therefore, this variable capacitor in its making includes a fixed first electrode 100; and a second electrode 200 formed with an insulating film 210, and when movement the insulating film 210 contacting the first electrode 100.

Finally, like FIG. 4a, a variable capacitor to move the first electrode 100 into the second electrode 200 direction realizes a capacitor through performing an operation of moving the first electrode 100 into an X direction and a Y direction.

And, as shown in FIG. 4b, a variable capacitor to move the second electrode 200 to the first electrode 100 direction implements a capacitor by performing an operation of moving the second electrode 200 into a Y direction and an X direction.

Herein, a drive power moving the first electrode 100 towards a second electrode 200, or moving the second electrode 200 in the first electrode 100 direction may be applied in any one of electrostatic force, piezoelectric force, heat driving force and magnetic force.

And, a variable capacitor according to the present invention may include a drive part moving the first electrode 100 towards a second electrode 200, or moving the second electrode 200 in the first electrode 100 direction.

Herein, the drive part may be realized by various structures and components, not limited to specific structures and technical parts.

Also, a movement moving the first electrode 100 towards a second electrode 200, or moving the second electrode 200 in the first electrode 100 direction may be motioned by a 2-axis movement or a 3-axis movement.

For instance, a 2-axis movement, as described above, motions the first electrode 100 or the second electrode 200 in an X direction and Y direction or in a Y direction and X direction.

While the present invention has been described in detail only regarding specific examples, it is clear to those skilled in the art that various modifications and variations can be made within the scope of the invention. And, it is obvious that such a modification and variation pertains to the accompanying claims.

INDUSTRIAL APPLICABILITY

The present invention may realize a variable capacitor capable of operating a variation range to infinity, improving characteristics of devices applied with this variable capacitor.

The invention claimed is:
1. A variable capacitor comprising:
a movable first electrode; and a second electrode formed with an insulating film, wherein the first electrode comprises a lower surface,
wherein a movement of the first electrode is done by a 2-axial movement, wherein the second electrode comprises a upper surface and a side surface, wherein the insulating film is disposed at the upper surface and the side surface of the second electrode, wherein the lower surface of the first electrode is closely contacted with the insulating by the 2-axial movement of the first electrode, wherein a capacitance value between the first electrode and the second electrode depends on a size of an area overlapped with the first electrode and the second electrode, wherein an RF signal flows from the first electrode to the second electrode or from the second electrode to the first electrode after closely adhering the lower surface of the first electrode to the insulating film.

2. The variable capacitor of claim 1, characterized in that a driving force moving the first electrode or the second electrode is one of electrostatic force, piezoelectric force, heat driving force and magnetic force.

3. A variable capacitor characterized by: a first electrode; and a second electrode formed with an insulating film, wherein the first electrode comprises a lower surface, wherein a movement of the second electrode is done by a 2-axial movement, wherein the second electrode comprises a upper surface and a side surface, wherein the insulating film is disposed at the upper surface and the side surface of the second electrode, wherein the lower surface of the first electrode is closely contacted with the insulating by the 2-axial movement of the second electrode, wherein a capacitance value between the first electrode and the second electrode depends on a size of an area overlapped with the first electrode and the second electrode, wherein an RF signal flows from the first electrode to the second electrode or from the second electrode to the first electrode after closely adhering the lower surface of the first electrode to the insulating film.

4. The variable capacitor of claim 3, characterized in that a driving force moving the first electrode or the second electrode is one of electrostatic force, piezoelectric force, heat driving force and magnetic force.

5. A drive method of a variable capacitor comprising: forming a capacitor comprising a first electrode and a second electrode with an insulating film, wherein the first electrode comprises a lower surface, wherein the second electrode comprises a upper surface and a side surface, and wherein the insulating film is disposed at the upper surface and the side surface of the second electrode;

moving the first electrode through a 2-axial movement and closely adhering the lower surface of the first electrode to the insulating film, or moving the second electrode through a 2-axial movement and closely adhering the insulating film to the lower surface of the first electrode; and flowing through an RF signal from the first electrode to the second electrode, or from the second electrode to the first electrode.

6. The drive method of a variable capacitor of claim 5, characterized in that according to a size of an area overlapped with the first electrode and the second electrode, a capacitance value varies.

7. The drive method of a variable capacitor of claim 5, characterized in that a driving force moving the first electrode or the second electrode is one of electric force, piezoelectric force, heat driving force and magnetic force.

* * * * *